United States Patent [19]
Avitan

[11] Patent Number: 5,265,021
[45] Date of Patent: Nov. 23, 1993

[54] MOTOR VEHICLE STEERING SYSTEM HAVING REVERSIBLE DIRECTION CONTROL

[75] Inventor: Isaac Avitan, Vestal, N.Y.

[73] Assignee: Raymond Corporation, Greene, N.Y.

[21] Appl. No.: 749,375

[22] Filed: Aug. 23, 1991

[51] Int. Cl.$^5$ ................ B60K 41/04; G06F 15/50
[52] U.S. Cl. ................ 364/424.05; 364/424.01; 192/0.08
[58] Field of Search ............. 364/424.05, 424.01, 364/426.02; 414/24.6, 666; 180/234; 192/0.08

[56] References Cited

U.S. PATENT DOCUMENTS

| | | | |
|---|---|---|---|
| 3,991,958 | 11/1976 | Sibley et al. | 246/77 |
| 3,994,407 | 11/1976 | Von Gal, Jr. et al. | 198/20 R |
| 4,472,663 | 9/1984 | Melocik | 318/82 |
| 4,529,919 | 7/1985 | Melocik et al. | 318/373 |
| 4,603,582 | 8/1986 | Middleton | 73/511 |
| 4,768,636 | 9/1988 | Ito et al. | 192/0.08 |
| 4,942,529 | 7/1990 | Avitan et al. | 364/424.01 |
| 4,968,205 | 11/1990 | Biasotto et al. | 414/24.6 |
| 4,995,774 | 2/1991 | Nusbaum | 180/234 |
| 5,011,363 | 4/1991 | Conley, III et al. | 414/666 |
| 5,068,791 | 11/1991 | Klopfleisch et al. | 364/424.02 |

Primary Examiner—Thomas G. Black
Assistant Examiner—Tan Q. Nguyen
Attorney, Agent, or Firm—Salzman & Levy

[57] ABSTRACT

The present invention features an automatically reversible steering system for a material handling vehicle. The system has a steering mechanism connected to the vehicular drive motor of the vehicle that controls the steer motor turning direction. When the operator of the vehicle engages automatic steer orientation, a signal is sent to a microprocessor controller. The microprocessor controller, in response to the received signal and direction of travel, properly orients the polarity of the steering motor, thus providing vehicle rotational travel relative to the operator's request, whereby the vehicle turns in the direction of expectation consistent with the steering sense. A manual over-ride control switch mounted on the vehicle control panel can allow the operator to select predominance of one sense over another, based on his preferred direction of travel.

15 Claims, 6 Drawing Sheets

MOTOR VEHICLE STEERING SYSTEM HAVING REVERSIBLE DIRECTION CONTROL

FIELD OF THE INVENTION

The present invention relates to steering controls for material handling vehicles such as fork lift trucks, and more particularly to a reversing steering control that is actuated in response to the direction in which a fork lift vehicle operator is facing with respect to the vehicle direction.

BACKGROUND OF THE INVENTION

Through the years, fork lift trucks have become an indispensable part of warehouse operations and plant inventory control. Their ability to maneuver in tight spaces and confined areas is legion. It is within these tight and difficult to maneuver areas that a vehicle operator will often find it necessary to maneuver the vehicle in both directions. Generally, the vehicle is configured, from a controls point of view, in a preferred mode of operation (e.g., forks leading versus tractor leading). Very often while facing the less preferred direction, the operator will still be working the controls and will continue to steer and operate the vehicle. It is at these times that the steering wheel will be inadvertently turned in a direction opposite to that intended by the operator.

The invention reflects the discovery, based on observing plant operations over many years, that even experienced vehicle drivers will often confuse the steering wheel direction when they face the less preferred direction of the vehicle. It is at these times that it would be useful to have a system that would automatically and/or manually reverse the steering wheel controls, such that the direction of steering wheel rotation is consistent with the direction of vehicle rotation, so that the vehicle driver can continue to move within the confined area with alacrity and dispatch.

The present invention has developed a system that determines or senses the direction of travel of the vehicle, and automatically and/or manually applies the appropriate steering controls to the vehicle. In other words, when a vehicle driver requests travel in the opposite to normal direction, and the vehicle begins to travel in that specified direction, the steering wheel will respond oppositely to the normal steering direction. Thus, a clockwise turn of the steering wheel that would normally turn the fork lift truck to the right, when facing the normal travel (fork leading) direction, will now direct the vehicle to the right when the vehicle is travelling opposite to the normal direction (i.e., the tractor leading direction), and vice versa.

The change of "steering sense" in accordance with this invention can be accomplished in several ways: (1) a velocity and direction sensor connected to the drive motor detects the direction of travel, and by means of feedback control is used automatically to orient the polarity of the steering motor relative to the direction of travel; (2) a reverse drive control lever mounted on the control panel of the fork lift truck generates a signal for directing a microprocessor controller to reverse the polarity of the steering motor; and (3) an accelerometer mounted upon the material handling vehicle senses the direction of movement of the vehicle, and sets the polarity of the steer motor accordingly.

The automatic reversing control of the present invention can also be manually actuated, over-ridden, or cancelled by a manually actuated control switch built into the control panel of the truck.

DISCUSSION OF THE RELATED ART

In U.S. Pat. No. 2,984,311, issued to Wehsely et al on May 16, 1961, for "Reversible Driving Mount for Automotive Vehicles," a mechanism is shown for operating a tractor in one of two different directions. While it is suggested that an operator can operate the vehicle through separate controls, the reversal of the steering sense of the wheel is never suggested or contemplated.

In U.S. Pat. No. 3,693,744, issued to Horn et al on Sep. 26, 1972, for "Multi-Purpose Vehicle," a dual direction vehicular propulsion system with a reversible seat and two steering wheels is shown. Again, while the vehicle can operate with separate controls, there is never suggested that the steering sense of the steering wheel can be reversed when facing the opposite direction.

In U.S. Pat. No. 3,195,913, issued to Hallsworth on Jul. 20, 1965, for "Rotatable Seat and Steering Column Arrangement for Vehicles," a built-in vehicle control mounted upon a 360 degree rotatable mount is illustrated. While the steering sense is reversed for the purpose of facing in an opposite direction, the reversal is effected through a complicated reversing gear system. Such a system is neither automatic, nor is it effected by means of a simple electrical control. Neither is this system actuated by positioning the chair in an opposite direction.

SUMMARY OF THE INVENTION

In accordance with the present invention, there is provided an automatically reversible steering system for a material handling vehicle. The system has a steering mechanism, such as a steering wheel that is operatively connected to the vehicular drive motor of the vehicle. The steer mechanism controls the steer motor turning direction. When the operator of the vehicle uses the hand controls of the vehicle to reverse the vehicle driving direction, the reversal signal is sent to a microprocessor controller. The microprocessor controller, in response to the received signal, reverses the polarity of the steering motor, thus changing the "steering sense" of the steering wheel. A sensor mounted upon the drive motor of the vehicle can also be used to generate a signal in response to sensing a reverse drive direction. This signal can also be used to reverse the polarity of the steer motor. Still another means of changing the "steer sense" of the vehicle can be provided by an accelerometer, that upon sensing a reverse drive direction, also can change the steer motor polarity via a control signal. A manual over-ride control switch mounted on the vehicle control panel can cancel or interrupt the reversing signal and restore the original polarity, if so desired.

It is an object of the present invention to provide an improved steering system for a material handling vehicle, such as a fork lift truck.

It is another object of the current invention to provide an automatic system for reversing the steering sense of the steering wheel when the vehicle travels in a substantially opposite direction to that of the fork leading direction.

It is a further object of this invention to provide a steer sensing control for a material handling vehicle that is e electrically controlled and actuated.

BRIEF DESCRIPTION OF THE DRAWINGS

A complete understanding of the present invention may be obtained by reference to the accompanying drawings, when taken in conjunction with the detailed description thereof, in which.

DESCRIPTION OF THE PREFERRED EMBODIMENT

Generally speaking, the invention comprises an automatic system for changing the steering sense of a steering wheel of a material handling vehicle in response to the direction of the vehicle travel direction.

For purposes of brevity, like elements will bear the same designations throughout the FIGURES.

Figure 1:
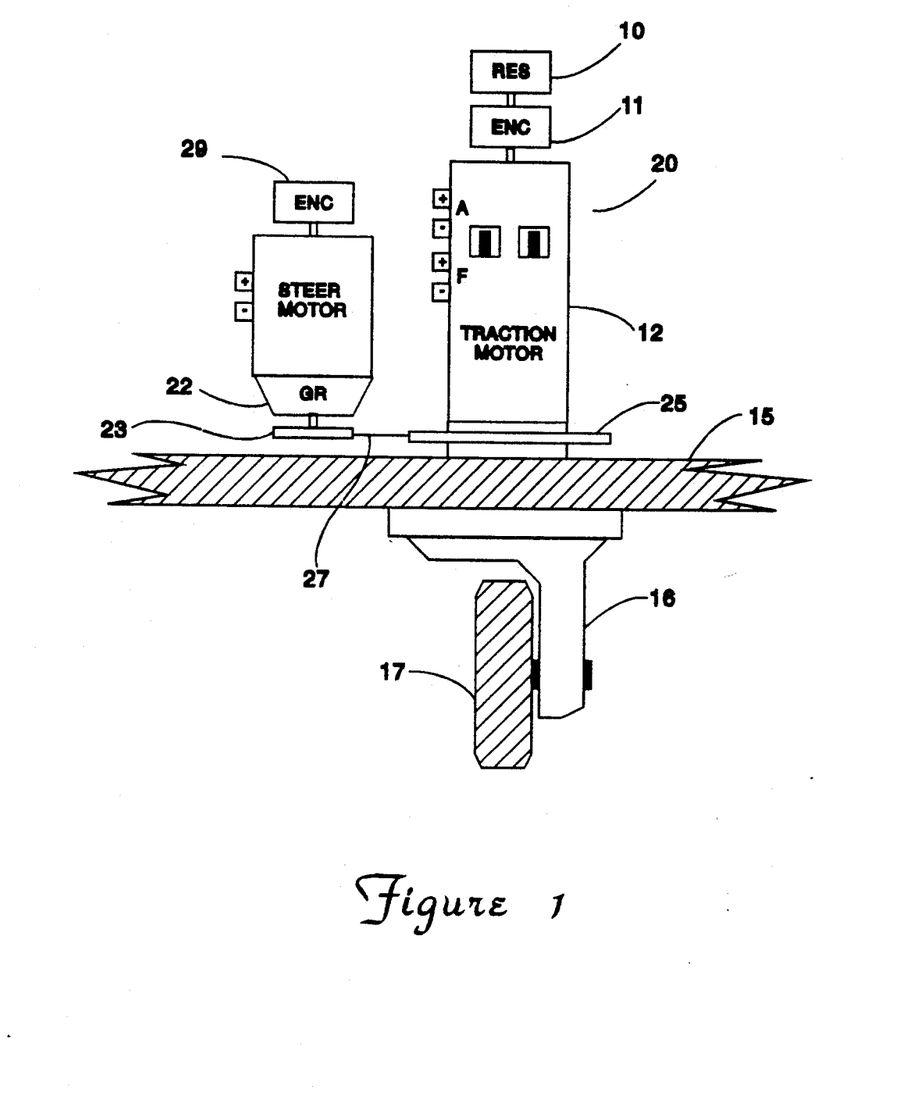
FIG. 1 is a schematic view, shown in sectional crosscut, of a conventional gear reducer, pinion gear, chain driven, steering and drive motor system for a material handling vehicle.

Now referring to FIG. 1, a conventional lift truck steering and drive system 20 is shown. The steering and drive system 20 features a spaced-apart steer motor 21 and traction (drive) motor 12.

The material handling truck has a single, combination steering and drive wheel 17 that is driven by the traction motor 12 via an internal drive shaft (not shown). The internal drive shaft engages the steering and drive unit 16. The steering and drive unit 16 comprises a transmission that adapts the speed of the wheel to that of the traction motor 12. The traction motor 12 and steering and drive unit 16 are attached and integrally mounted on the material handling truck frame 15.

A pinion gear 23 driven by the steer motor 21 through a gear reducer 22 drives a master gear 25 attached to the traction motor 12 via a drive chain 27. A steer motor speed sensor 29 is mounted upon the steer motor 21, which can be either an electric or a hydraulic motor. Steer motor speed sensor 29 detects the speed of steer motor 21.

A steer position sensor 10 and a travel speed and direction sensor 11 are mounted upon the traction motor 12, as shown. Travel speed and direction sensor 11 detects the speed and direction o travel (i.e., the forks leading or tractor leading direction) of traction motor 12 on which sensor 11 is mounted, while steer position sensor 10 detects drive unit steering position. Upon detection of drive direction reversal, as indicated by an appropriate signal generated by travel speed and direction sensor 11, the polarity of steer motor 21 is reversed, thus changing the "steering sense" of the vehicle.

Figure 2:
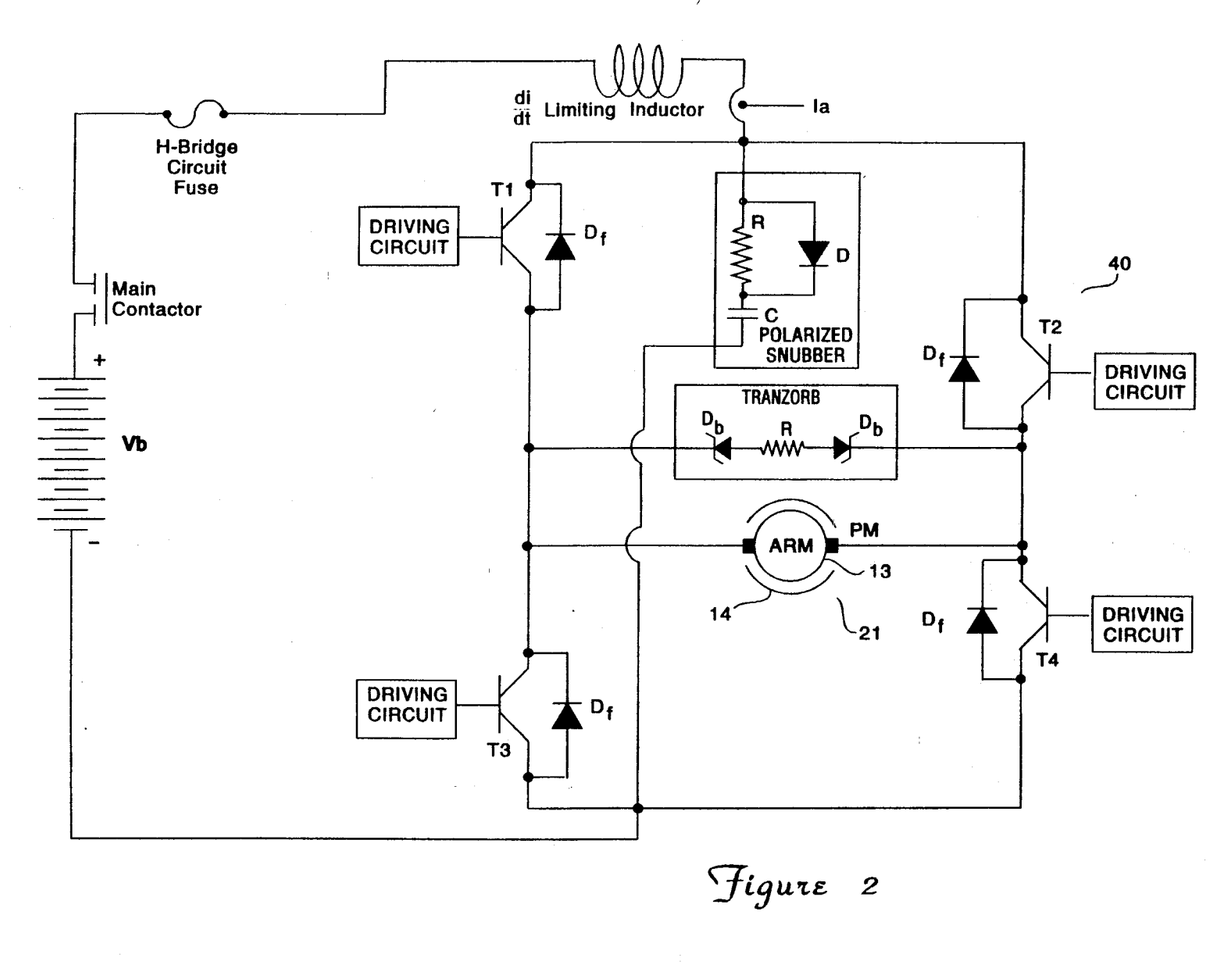
FIG. 2 is a circuit diagram for controlling the steering system depicted in FIG. 1.

Referring now also to FIG. 2, the power control circuit includes a transistorized, H-bridge armature voltage amplifier circuit 40 connected across the armature 13 of the steering motor 21. The H-bridge armature voltage amplifier circuit 40 determines the direction of dc motor rotation, and applied voltage to the armature.

The direction of the steering motor 21 can also be reversed, in order to reverse the steering sense of the steering lever 80 (FIG. 4), in accordance with the present invention, when a signal from steering lever 80 that reverses the driving direction of drive motor 12 is actuated. The reversal of the vehicle direction accomplished by the steering lever 80 also acts to direct a microprocessor controller to reverse the polarity of the steer motor 21, and hence its steer direction. An accelerometer (not shown) can also detect the direction of the vehicle movement, and can provide a reversing steer motor signal.

Figure 3:
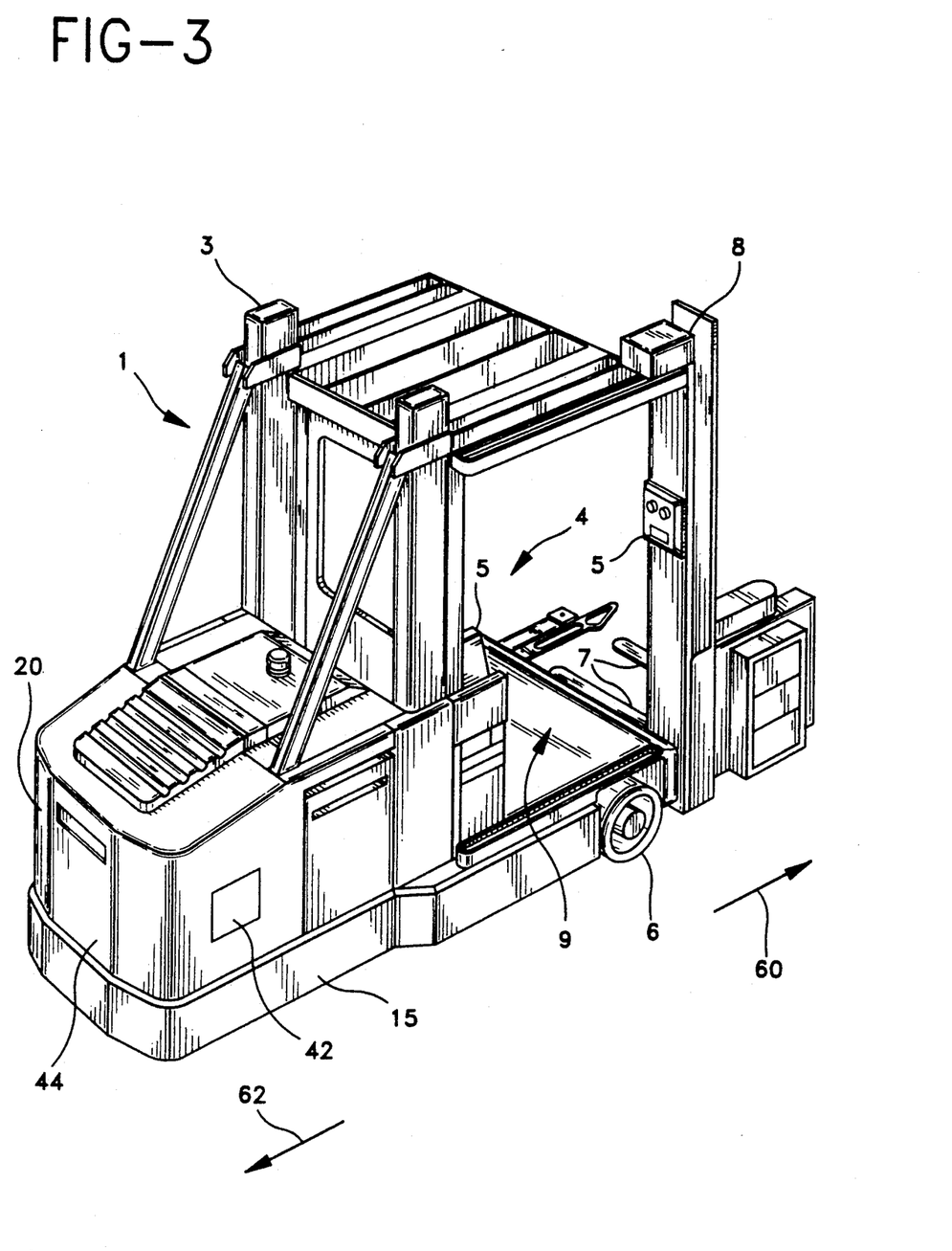
FIG. 3 is a perspective view of a feedback control system disposed upon a fork lift truck, for changing the steering sense of the steer motor illustrated in the circuit diagram of FIG. 2.

Referring now to FIG. 3, there is shown a perspective view of a material handling vehicle 1, the preferred embodiment being referred to as a lift truck. Vehicle 1 comprises a tractor frame 15, to which are mounted the major operating components of the vehicle 1, such as a main telescoping mast 3, to which is connected an elevating platform 9, an operator control station 4 with suitable displays 5, two non-steerable wheels 6, forks 7, and an auxiliary mast 8. A steering and drive system 20 is disposed at the rear of the vehicle 1 operatively connected to tractor frame 15 beneath a traction motor (not shown).

Figure 4:
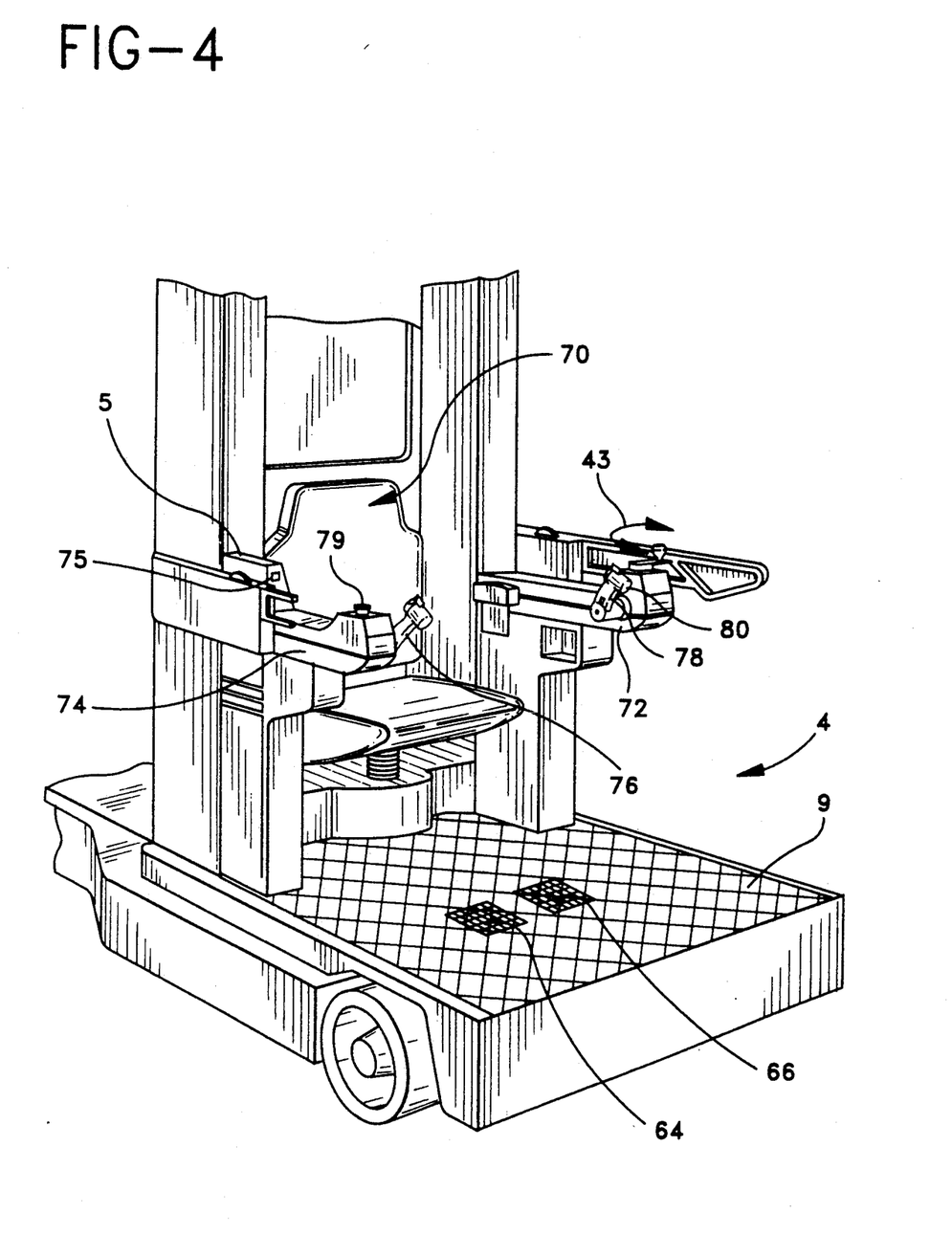
FIG. 4 is a front exploded view of the operator control station in which the steering control is disposed.
Figure 5A:
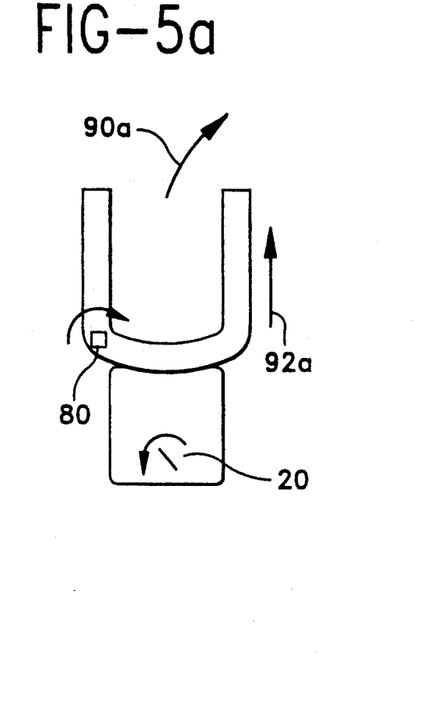
FIGS. 5a–5h are elevated schematic views showing various vehicle orientations in conjunction with appropriate steering directions.
Figure 5B:
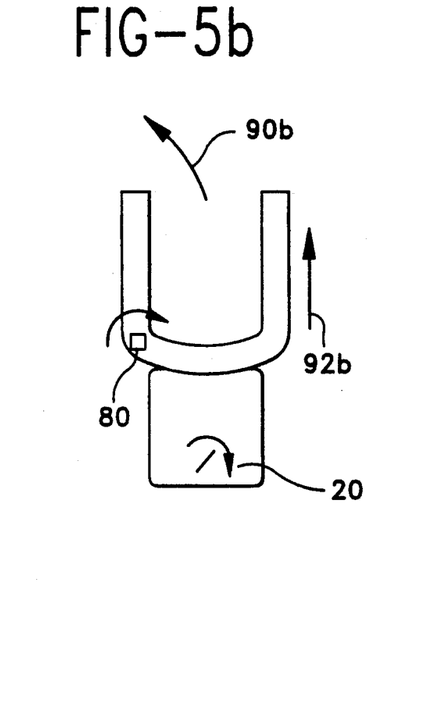
Figure 5C:
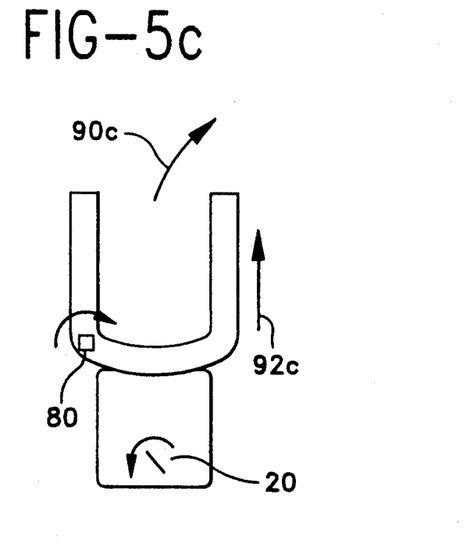
Figure 5D:
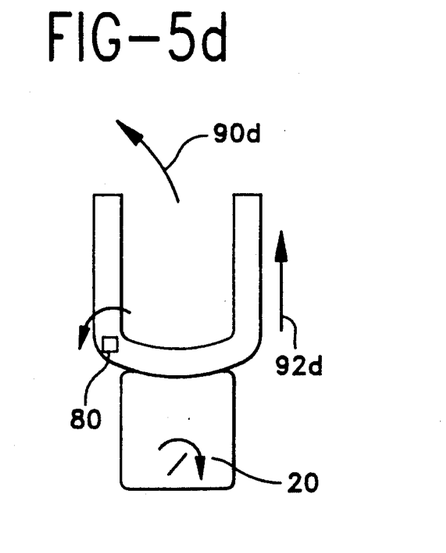
Figure 5E:
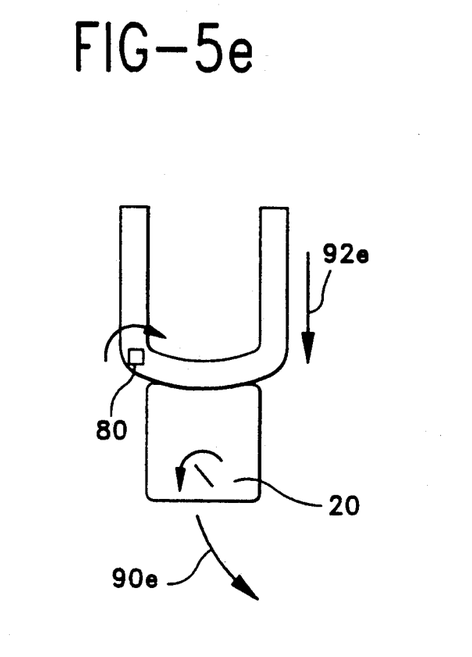
Figure 5F:
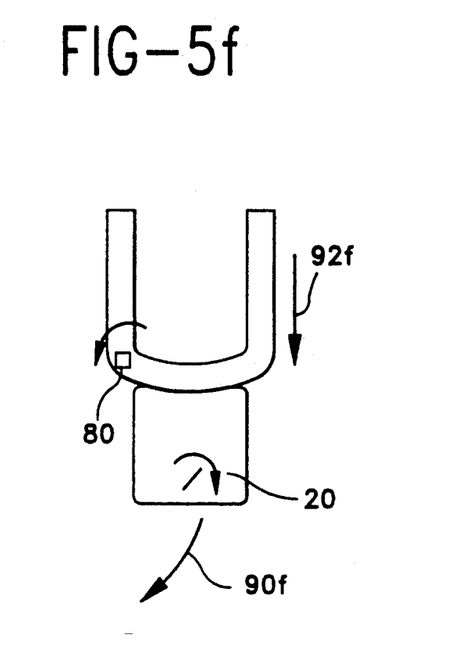
Figure 5G:
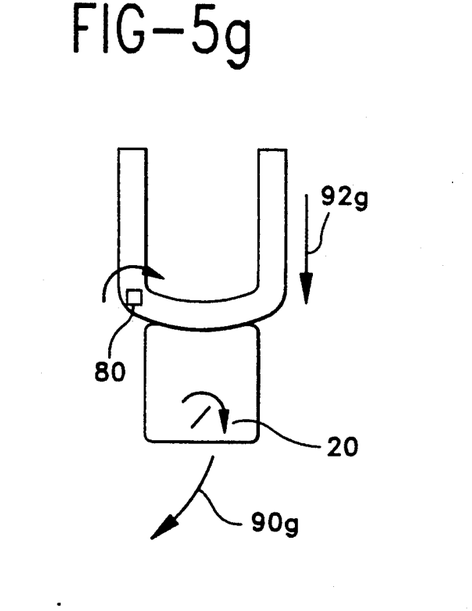
Figure 5H:
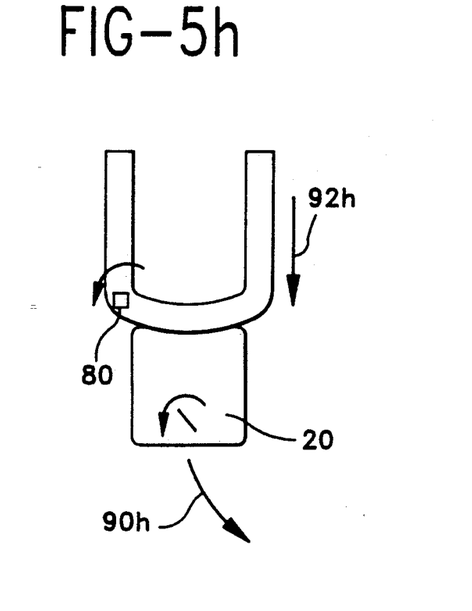

Referring now also to FIG. 4, there is shown a front view of operator control station 4. The operator controls comprise control arms 72 and 74, control handles 76 and 78, a display 5, a steering lever 80, and emergency power off disconnect push-button 79, and deadman pedals 64 and 66.

The positional change (arrows 43) of the steering lever 80 of the material handling vehicle 1 controls the turning direction (i.e., clockwise or counter-clockwise) in which wheel 17 (FIG. 1) is directed. The vehicle 1 is normally driven forward, or in the forks leading direction (arrow 60, FIG. 3).

When it is desired to reverse the direction of travel of vehicle 1 towards the tractor leading direction (arrow 62), a control switch 75 near display 5 of vehicle 1 is manually actuated by the vehicle operator (not shown). Switch 75 has three settable positions, appropriately marked: CW, CCW, and AUTO. The control switch 75 sends a signal to a microprocessor 42 (FIG. 3) which in turn orients the steering motor 21 (FIG. 1) to the desired direction. In this manner, an operator of the vehicle 1 can be facing toward the direction of travel while turning (arrow 43) the steering lever 80 and have the vehicle turn in the desired direction.

Alternatively, the operator can select the automatic mode, in which case microprocessor 42 (FIG. 3) specifies orientation of steering lever 80 relative to travel direction of vehicle 1. Automatic mode is specified by the operator by means of switch 75 (FIG. 4). In the fixed mode CW and responsive to the steering lever 80, the vehicle turns in the clockwise rotational direction for the operator facing the direction of longitudinal travel in the forks leading direction; conversely, the vehicle turns in the counter-clockwise rotational direction for the operator facing the direction of longitudinal travel in the tractor leading direction. In fixed mode CCW, however, the opposite vehicle turning motion occurs. But in the automatic mode, the vehicle turns in the direction of expectation, consistent with, and responsive to the steering lever 80.

The various combinations of steering handle motion and vehicle movement both in conventional steering sense mode and in automatic or reverse mode, for forks leading and for tractor leading operation, are depicted in Table I, shown below.

TABLE I

| Rotation Direction of Travel | Steering/Movement Orientation | |  |  |
|---|---|---|---|---|
| | Tractor ↓ Leading | | Forks ↑ Leading | |
| Steering Lever Rotation Fixed Mode: | cw | ccw | cw | ccw |
| Drive Unit | ccw | cw | ccw | cw |
| Vehicle | ccw | cw | cw | ccw |
| Automatic Mode: | | | | |
| Drive Unit | cw | ccw | ccw | cw |
| Vehicle | cw | ccw | cw | ccw |

Note:
cw = clockwise rotation
ccw = counter clockwise rotation

Vehicle orientations for forks leading and tractor leading travel in all eight situations depicted in Table I are shown schematically in FIGS. 5a-5h, in which steering lever 80 (FIG. 4) and rotational movement of drive unit 20 (FIG. 1) are indicated by arrows. Vehicle rotation is shown by arrows 90a-90h. Up arrows 92a-92d indicate forks leading, while down arrows 92e-92h indicate tractor leading. Table II correlates steering and drive unit orientation with each of the FIGS. 5a-5h.

TABLE II

| FIG. | Description of FIGS. 5a-5h Operating Parameters |
|---|---|
| 5a | Fixed mode; forks leading; cw steer; cw vehicle |
| 5b | Fixed mode; forks leading; ccw steer; ccw vehicle |
| 5c | Automatic mode; forks leading; cw steer; cw vehicle |
| 5d | Automatic mode; forks leading; ccw steer; ccw vehicle |
| 5e | Fixed mode; tractor leading; cw steer; ccw vehicle |
| 5f | Fixed mode; tractor leading; ccw steer; cw vehicle |
| 5g | Automatic mode; tractor leading; cw steer; cw vehicle |
| 5h | Automatic mode; tractor leading; ccw steer; ccw vehicle |

While the present embodiment features the automatic change of steering sense of the steering wheel in response to the control of the driving direction of the vehicle, it is also possible to change the steering sense automatically in response to other stimuli. As aforementioned, an accelerometer not shown) mounted upon vehicle 50, rather than the sensor 11, may detect the change in direction of the vehicle.

Thus, the invention can automatically determine the steering sense of the steering mechanism through the change of direction initiated by the operator, and can adjust the steering sense of the steering lever 80 accordingly.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Paten is presented by the subsequently appended claims.

What is claimed is:

1. An automatically reversible steering system for a material handling vehicle that changes a steering sense of the vehicle in response to a driven direction of said material handling vehicle, comprising:

steering means disposed upon said material handling vehicle for determining a turning direction of said material handling vehicle;

a steering-drive wheel operatively connected to said steering means for moving said material handling vehicle in a drive direction;

a steering motor for steering said steering-drive wheel of said material handling vehicle in said drive direction;

direction determining means for determining a direction of a vehicle with respect to either a respective fork leading drive or a tractor leading drive direction of said material handling vehicle, and in response thereto, said direction determining means generating a control signal; and a microprocessor control unit operatively connected to said direction determining means, said microprocessor control unit receiving said control signal, and in response thereto, controlling a polarity of said steering motor, whereby an operator facing opposite said fork leading direction of said material handling leading direction of said material handling vehicle can steer said material handling vehicle in an opposite steering sense.

2. The automatically reversible steering system for a material handling vehicle in accordance with claim 1, further comprising an over-ride switch operatively connected to said steering motor, for over-riding a reversal of said polarity by said microprocessor control unit.

3. The automatically reversible steering system for a material handling vehicle in accordance with claim 1, wherein said direction determining means further comprises a control switch mounted upon said vehicle.

4. The automatically reversible steering system for a material handling vehicle in accordance with claim 1, wherein said direction determining means further comprises an accelerometer mounted upon said vehicle.

5. The automatically reversible steering system for a material handling vehicle in accordance with claim 1, further comprising a traction motor for driving said material handling vehicle, and wherein said direction determining means further comprises a speed and direction sensor mounted upon said traction motor for determining the direction of the material handling vehicle, and in response thereto, generates a signal for reversing the polarity of said steer motor.

6. An automatically reversible steering system for a material handling vehicle that changes the steering sense of the vehicle in response to a driven direction of said material handling vehicle, comprising:

steering means for steering said material handling vehicle to a steering position;

a steering motor operatively connected to said steering means for steering said material handling vehicle in response to a steering position;

means for determining a drive direction of a vehicle with respect to either a respective fork leading direction or a traction leading direction of said material handling vehicle, and in response thereto, for supplying a control signal; and a microprocessor control unit operatively connected to said means for determining a drive direction, said microprocessor control unit receiving said control signal, and in response thereto, controlling a steering sense of said steering wheel, whereby a vehicle operator facing towards said tractor leading direction of said vehicle can steer said material handling vehicle in an opposite steering sense.

7. The reversible steering system for a material handling vehicle in accordance with claim 6, further comprising an over-ride switch operatively connected to said steering motor for over-riding a reversal of said steering sense by said microprocessor control unit.

8. The reversible steering system for a material handling vehicle in accordance with claim 6, wherein said means for determining a drive direction of said vehicle further comprises a control switch mounted upon said vehicle.

9. The reversible steering system for a material handling vehicle in accordance with claim 6, wherein said means for determining a drive direction of said vehicle further comprises an accelerometer mounted upon said vehicle.

10. The automatically reversible steering system for a material handling vehicle in accordance with claim 6, further comprising a traction motor for driving said material handling vehicle, and wherein said direction determining means further comprises a speed and direction sensor mounted upon said traction motor for determining the direction of the material handling vehicle, and in response thereto, generates a signal for reversing the polarity of said steer motor.

11. An automatically reversible steering system for a material handling vehicle that changes a steering sense of the vehicle in response to a change of a driven direction of a vehicle, comprising:

steering means disposed upon said material handling vehicle for determining a turning direction of said material handling vehicle;

a steering-drive wheel operatively connected to said steering means for moving said material handling vehicle in a drive direction;

a steering motor for steering said steering-drive wheel of said material handling vehicle in said drive direction;

driving direction determining means for determining a driven direction of a vehicle, whether either fork leading or tractor leading, and in response thereto, for supplying a control signal; and control means operatively connected to said driving direction determining means, said control means receiving said control signal, and in response thereto, controlling a polarity of said steering-drive wheel, whereby a vehicle operator facing substantially opposite said fork leading direction of said material handling vehicle can steer said material handling vehicle in an opposite steering sense.

12. The automatically reversible steering system for a material handling vehicle in accordance with claim 11, further comprising an over-ride switch operatively connected to said steering motor for over-riding a reversal of said polarity by said control means.

13. The automatically reversible steering system for a material handling vehicle in accordance with claim 11, wherein said driving direction determining means further comprises a control switch mounted upon said vehicle.

14. The automatically reversible steering system for a material handling vehicle in accordance with claim 11, wherein said driving direction determining means further comprises an accelerometer mounted upon said vehicle.

15. The automatically reversible steering system for a material handling vehicle in accordance with claim 11, further comprising a traction motor for driving said material handling vehicle, and wherein said direction determining means further comprises a speed and direction sensor mounted upon said traction motor for determining the direction of the material handling vehicle, and in response thereto, generates a signal for reversing the polarity of said steer motor.

* * * * *